United States Patent [19]

Boyle

[11] Patent Number: 4,738,939
[45] Date of Patent: Apr. 19, 1988

[54] REGENERATION AND REACTIVATION OF REFORMING CATALYSTS WHILE PASSIVATING IRON SCALE CARRYOVER FROM THE REGENERATOR CIRCUIT TO THE REACTORS

[75] Inventor: Joseph P. Boyle, Sarnia, Canada

[73] Assignee: Exxon Research and Engineering Company, Florham Park, N.J.

[21] Appl. No.: 67,541

[22] Filed: Jun. 29, 1987

[51] Int. Cl.$^4$ .................... B01J 23/96; B01J 38/44
[52] U.S. Cl. ................................. 502/37; 208/140
[58] Field of Search .................. 502/37, 517; 208/140

[56] References Cited

U.S. PATENT DOCUMENTS

| | | | |
|---|---|---|---|
| 2,980,631 | 11/1984 | Craig et al. | 502/37 |
| 3,137,646 | 6/1964 | Capsuto et al. | 208/65 |
| 3,835,063 | 9/1974 | Davis, Jr. et al. | 252/415 |
| 4,482,637 | 11/1984 | Buss et al. | 502/37 |
| 4,514,284 | 4/1985 | Wairegi et al. | 208/140 |
| 4,517,076 | 5/1985 | Boyle et al. | 208/140 |

*Primary Examiner*—Paul E. Konopka
*Attorney, Agent, or Firm*—Roy J. Ott

[57] ABSTRACT

A process for the regeneration and reactivation of coked iridium-containing catalysts, and chemical modification and passivation of iron scale carried over from a ferrous metal regeneration circuit to the catalyst-containing reactor, or reactors, to suppress reaction between the iron scale and catalyst as normally occurs when iron scale contacts the catalyst of a reactor, or reactors. The iron scale is rendered non-reactive or inert in the reactor environment by converting the iron scale to a passive form, preferably ferric oxide, by employing ab initio an extended low temperature primary burn while purging the system of carbon oxides, notably carbon monoxide and carbon dioxide. Thereafter, the agglomerated metal, or metals, component of the catalyst is redispersed at conditions insufficient to reduce the oxidized iron scale which is contained in admixture with the regenerated catalyst. The agglomerated metal, or metals, component of the regenerated catalyst contained in admixture with the passivated iron scale is redispersed in a non-reducing atmosphere to return the catalyst to its active state without reduction of the passivated iron scale. This process is an improvement in those described in U.S. Pat. No. 4,514,284 and U.S. Pat. No. 4,517,076, respectively.

12 Claims, No Drawings

REGENERATION AND REACTIVATION OF REFORMING CATALYSTS WHILE PASSIVATING IRON SCALE CARRYOVER FROM THE REGENERATOR CIRCUIT TO THE REACTORS

I. FIELD OF THE INVENTION

This invention relates to improvements in a process for the regeneration and reactivation of deactivated catalysts. In particular, it relates to the regeneration and reactivation of coked iridium-containing reforming catalysts, especially iridium promoted platinum reforming catalysts.

II. BACKGROUND

Catalytic reforming, or hydroforming, is a process in wide use by the petroleum industry for upgrading naphthas and straight run gasolines to improve the octane quality of the product. This process is generally carried out in a multi-reactor system, usually containing three or four ferrous metal reactors in series. Each reactor is provided with a ferrous metal preheater through which the feed and hydrogen are passed during the on-oil portion of an operating cycle prior to introduction into a reactor. Each reactor is also provided with one or more beds of reforming catalyst, the feed and hydrogen being introduced generally downflow into a reactor, flowing through the catalyst beds in sequence from one reactor to the next of the series. During the on-oil portion of an operating cycle coke deposits on the catalyst; the coke deposition resulting in a decrease in the number of catalytically active sites, with a concurrent loss of catalyst activity. Consequently, as coke builds up on the catalyst surface the temperature of a given reactor is gradually increased to offset the loss of catalyst activity caused by coke build up. Inevitably it is required that the coked catalyst be taken off oil, regenerated by burning the coke from the catalyst, and the catalyst reactivated by redispersing the agglomerated metallic hydrogenation-dehydrogenation component, e.g., platinum, or platinum and iridium. On-oil reforming, as relates to the use of a given reactor, can then be resumed.

The multi reactor system through the use of ferrous metal manifolds, pipes and valving is associated on the one hand with production facilities for on-oil use and, on the other hand, with regeneration facilities for use in regeneration and reactivation of the catalyst. When the catalyst of a reactor, or reactors, must be regenerated and reactivated the reactor must be taken off-oil and connected to the regeneration facilities. In a semi-regenerative type reforming operation, to regenerate and reactivate the coked catalyst, the entire multi reactor system is shut down for regeneration and reactivation of the catalyst. The catalyst in the several reactors is then regenerated and reactivated and the unit as a whole is then returned to on-oil production. In a cyclic reforming operation, the reactors of the multi reactor system are individually swung out of line by the piping and valving arrangement used, and the catalyst regenerated and reactivated while the other reactors are maintained on-oil. A "swing reactor" temporarily replaces a reactor which is removed from the series for regeneration and reactivation of the catalyst, after which time it is put back in series. On-oil production is continuous, and the catalyst can be regenerated and reactivated without interference with production.

The earlier platinum catalysts were readily regenerated by burning the coke off the catalyst at controlled conditions in an atmosphere of oxygen, or oxygen and chlorine, at contolled flame front temperature, and the agglomerated platinum component then redispersed with relative ease by contact at elevated temperature with chlorine, generally in admixture with oxygen, to increase the rate of dispersion. However, this is not the case with the more modern iridium-containing, or iridium promoted platinum catalysts. In an oxygen atmosphere at elevated temperature the iridium component of an iridium-containing catalyst is severely agglomerated and the catalyst readily damaged. Nonetheless techniques have been developed by virtue of which iridium, or iridium in admixture with platinum, or platinum and other metal components can be redispersed to the required high surface area state.

Regeneration and reactivation of iridium containing catalysts typically requires one or more cycles of a sequence of steps which include (i) oxidation of the catalyst in an oxidizing atmosphere in a controlled burn off of the carbon from the coked catalyst, (ii) reduction of the oxidized metallic components of the catalysts in a hydrogen atmosphere, and (iii) treatment of the catalyst by contact of same with halogen, an admixture of halogen and oxygen, or an admixture of halogen halide and oxygen, to redisperse the agglomerated iridium component or iridium-containing metallic components. Regeneration and reactivation of the catalyst results in the formation of a large amount of iron scale within the regeneration circuit of the reactor system, and the transfer of iron from the interior of the vessels and piping of the regeneration circuit onto the surface of the catalyst of the reactor. The transfer of iron scale onto the catalyst suppresses the activity of the freshly activated catalyst. The migration of scale from the regeneration circuit to the beds of catalyst within the reactor is particularly troublesome at the side of the bed first contacted by the gases from the regeneration circuit, e.g., at the top of the beds in a downflow reactor. Catalyst activity depression at this location can thus be particularly severe, the scale becoming chemically bound to the surface of the catalyst.

Exclusion of the iron scale from contact with the catalyst has been achieved by a number of prior art techniques. These include dumping the catalyst from the reactor, screening off the most contaminated portion of the catalyst, and returning the uncontaminated or less contaminated catalyst to the reactor. This quite obviously is time consuming, and not only costly as a result of the lost time, but expensive due to loss of catalyst, and lost production. The installation of an on-stream filter in advance of the reactor has also been tried, but this has resulted in significant capital expenditures, as well as increased production costs due to the pressure drop within the regeneration circuit.

Current procedures required for the regeneration and reactivation of iridium-containing catalysts thus result in the formation and transfer of iron scale from the regeneration circuit to the reactors. Reactor scale migrates to the catalyst becoming chemically bound thereto to cause decreased catalyst activity. Present methods are inadequate to deal with this problem, as a result of which the catalyst suffers loss in catalyst activity despite the fact that the basic purpose of the regeneration and reactivation procedure which is employed is to restore the activity of the catalyst prior to its return to on-oil service.

III. OBJECTS

It is accordingly the primary objective of the present invention to provide a new and improved process which will overcome these and other disadvantages by chemically modifying, or passivating the iron scale to eliminate the adverse effects caused to the catalyst with which it comes in contact when carried over from a regeneration circuit to a reactor, or reactors, such as occurs in the regeneration of coked reforming catalysts, especially in the application of sequential oxidation and reduction steps, particularly as required in the regeneration and reactivation of coked iridium-containing catalysts.

More particularly, it is an object to provide a process which not only will suppress the adverse effects of iron scale carryover on the reforming catalysts, but at the same time will achieve essentially complete removal of the carbon from the coked catalyst.

A further and yet more specific object is to provide a process for oxidizing and passivating the iron scale to mitigate or suppress its normal adverse effect on contact between the iron scale and the catalyst, notably an iridium-containing catalyst.

IV. THE INVENTION

These objects and others are achieved in accordance with this invention embodying a process for the regeneration and reactivation of coked iridium containing catalysts, and chemical modification and passivation of iron scale carried over from a ferrous metal regeneration circuit to the catalyst-containing reactor, or reactors, to suppress reaction between the iron scale and catalyst as normally occurs when iron scale contacts the catalyst of a reactor, or reactors. During the catalyst regeneration and reactivation procedure, in accordance with the practice of the present invention, the iron scale is rendered non-reactive or inert in the reactor environment by converting the iron scale to a passive form, preferably ferric oxide, by employing ab initio an extended low temperature primary burn while purging the system of carbon oxides, notably carbon monoxide and carbon dioxide. Thereafter, the agglomerated metal, or metals, component of the catalyst is redispersed at conditions insufficient to reduce the oxidized iron scale which is contained in admixture with the regenerated catalyst. In other words, reduction steps subsequent to the primary burn, as generally conventionally practiced, are avoided to maintain the iron scale in a form which is non-reactive with the catalyst. The agglomerated metal, or metals, component of the regenerated catalyst contained in admixture with the passivated iron scale is redispersed in a non-reducing atmosphere to return the catalyst to its active state without reduction of the passivated iron scale.

In the practice of this invention, the sequence of steps required for the regeneration and reactivation of an admixture of iron scale and coked, deactivated iridium-containing catalyst includes (1) a first step of contacting the admixture with hydrogen or a hydrogen-containing gas at temperature sufficient to reduce iridium-oxides to substantially metallic iridium, if iridium oxides are present. If iridium oxides are not present the step is not required; if iridium oxides are present the step is generally necessary since only the reduced iridium agglomerates will be redispersed in subsequent steps. Generally, the reduction temperature ranges from about 250° C. to about 550° C., preferably from about 350° C. to about 450° C., which is adequate to reduce any iridium oxides present to metallic iridium. The required sequence of steps of the process include (2) an extended low temperature primary burn step wherein (i) the chloride level of the coked, deactivated iridium catalyst of the admixture of iron scale and catalyst is increased by contact with a dry hydrogen chloride containing gas, (ii) the coke is then burned from said chlorided, coked iridium-containing catalyst of said admixture by contact with a dry gas which contains hydrogen chloride at level sufficient to suppress iridium agglomeration at burn temperature and a level of oxygen providing temperatures which do not exceed about 425° C. sufficient to remove a preponderance of the coke without agglomeration of the iridium (or without increase in the level of agglomeration, where the iridium is already agglomerated), and (iii) the duration of the burn is extended sufficiently beyond the actual time of coke burn off at this temperature that the iron scale of the admixture of iron scale and catalyst is oxidized to essentially ferric oxide; (3) a high temperature secondary burn, wherein the predominately coke depleted chlorinated iridium-containing catalyst is subjected to (iv) a chlorination step wherein the catalyst is contacted with a dry hydrogen chloride containing gas sufficient to redisperse any agglomerated iridium, particularly iridium agglomerates, produced during said low temperature primary burn, if any, and raise the chloride level of the catalyst to a yet higher level for suppression of iridium agglomeration at higher temperature than 425° C., (v) residual coke is then burned from said higher chlorided, iridium-containing catalyst by contact with a dry gas which contains hydrogen chloride at level sufficient to suppress iridium agglomeration at the higher burn temperature, and a level of oxygen sufficient to provide temperatures greater than 425° C., and ranging as high as about 530° C., sufficient to burn the preponderance of the residual coke from the catalyst without agglomeration of the iridium (or increase in the level of iridium agglomeration, where the iridium is already agglomerated prior to initiation of the high temperature secondary regeneration sequence). Preferably, in an additional step (4) the catalyst is stripped to reduce the level of chloride by contact of the catalyst with steam, or steam and hydrogen chloride, the molar ratio of $H_2O/HCl$ being maintained within a range of from about 80:1 to about 20:1, preferably from about 50:1 to about 30:1, to reduce the chloride content of the catalyst below about 1.0 percent, based on the weight of the catalyst, this rendering the catalyst suitable for use in a catalytic reforming, or on-oil run wherein the catalyst is contacted with a hydrocarbon, or naphtha feed.

In initiating the extended low temperature primary burn step (2), supra, a bed containing the admixture of the iron scale and the iridium-containing catalyst is contacted with a non-reactive or inert gas which contains hydrogen chloride, and essentially no water. The gas should be as dry as possible, and should contain no more than about 50 parts of water, preferably about 10 parts of water, per million parts by volume (vppm) of gas. The bed is contacted and the catalyst thereof chlorided to a level ranging from about 0.9 percent to about 1.5 percent chloride, preferably from about 1.0 percent to about 1.2 percent chloride, based on the weight of the catalyst (dry basis) if the catalyst does not already contain this level of chloride. This level of chloride has been found adequate to protect, or passivate the iridium component of the catalyst against agglomeration, or significant increase in the level of agglomeration during the low temperature burn step, if the catalyst is already partially agglomerated. After the catalyst has been adequately chlorided, the low temperature burn is initiated by contacting said bed of catalyst with a gas which contains both hydrogen chloride and oxygen, the hydrogen chloride in concentration adequate to maintain the necessary protective level of chloride on the catalyst to prevent iridium agglomeration, or increased iridium agglomeration, and the oxygen in adequate concentration to provide the desired flame front temperature for burn off of the coke. In general, the gas will contain from about 10 parts per million, by volume of said gas (vppm), to about 100 vppm hydrogen chloride, preferably from about 30 vppm to about 50 vppm hydrogen chloride, and up to about 5000 parts, preferably from about 1000 to about 5000 parts oxygen, more preferably from about 2000 parts to about 4000 parts of oxygen, based on a million parts by volume of said gas, this amount of oxygen being adequate to maintain a flame front temperature not exceeding about 425° C., preferably ranging from about 375° C. to a maximum of about 425° C., more preferably from about 400° C. to about 425° C. The reaction is conducted for time sufficient for the flame front to pass through the bed and burn coke from the catalyst without agglomeration, or significant increase in agglomeration of the iridium. Generally, in the low temperature primary burn from about 60 percent to about 90 percent, preferably from about 70 percent to about 90 percent of the coke, based on the weight of the catalyst (dry basis), is removed from the catalyst.

After passage of the flame front through the bed, which often requires a period ranging up to about 120 hours, most often up to about 72 hours, the addition of the oxygen-containing gas to the bed is continued for a time sufficient to oxidize the iron scale to ferric oxide. The end of the burn is readily known in that the flame front after continuing to advance from the entry side to the exist side of the bed thereafter fades away and disappears. The temperature of the catalyst bed, or beds, of a reactor is within 5° C. of the temperature of the inlet gas to the reactor. Oxygen thereafter breaks through the exit side of the bed, the oxygen concentration at the reactor outlet equalling the oxygen concentration at the reactor inlet. The level of carbon oxides produced by the burning coke drops, and lines out at a level wherein no significant amount of carbon oxides remain in the exit gas. Carbon dioxide can no longer be detected in the exit gas since it is gradually removed from the recirculating regeneration gas through purging and scrubbing. After coke burn off, the duration of the "burn period", or treatment with the oxygen-containing gas is generally continued for a period of time ranging up to about 12 hours, generally for a period ranging from about 1 hour to about 12 hours, preferably for a period ranging from about 4 hours to about 12 hours. The iron scale, by virtue of the low temperature extended burn period is substantially completely converted to ferric oxide in which state it is no longer reactive with the catalyst.

The catalyst chlorination step, conducted on initiation of the secondary, or higher temperature burn step, is conducted for the purpose of protecting the iridium component against agglomeration, or increase in the level of agglomeration, during the subsequent higher temperature burn. The catalyst is chlorinated by contact of the catalyst with a hydrogen chloride containing gas in the absence of water, which means that the hydrogen chloride containing gas should be as dry as possible, or in no event should the gas contain moisture at a level greater than about 50 parts of water, preferably greater than about 10 parts of water, per million parts by volume of the gas. In general, the gas used to carry out the catalyst chlorination step will contain up to about 5000 parts, preferably from about 100 parts to about 5000 parts of hydrogen chloride, more preferably from about 400 parts to about 3000 parts of hydrogen chloride, per million parts by volume of gas. The catalyst is contacted with such gas for a time sufficient to increase the chloride level of the catalyst to at least about 1.6 percent, based on the weight of the catalyst. At chloride concentration below this level, secondary burn conditions will produce agglomeration of the iridium. Preferably the concentration of chloride ranges between about 1.6 percent and 2.5 percent, based on the total weight of the catalyst (dry basis). Larger concentrations of chloride on the catalyst are not necessary to adequately protect the catalyst during the high temperature secondary burn. There is a trade off between the time required for adequate chlorination of the catalyst and the hydrogen chloride concentration of the gas used for chloriding the catalyst. Larger hydrogen chloride concentration in the gas thus require less contact time to adequately chlorinate the catalyst, and conversely lower hydrogen chloride concentrations in the gas require greater contact time. For example, at a gas flow rate of 27 SCF/hr/lb of catalyst, a gas containing 1600 vppm of hydrogen chloride will require about 2 hours for chlorination, and a gas containing about 100 vppm of hydrogen chloride will require about 40 hours to accomplish the same amount of chlorination. In chloriding the catalyst, it is generally adequate to use a gas containing the same or about the same concentration of hydrogen chloride as employed in chloriding the catalyst for the low temperature primary burn, though to offset the additional time required to complete chlorination of the catalyst, the concentration of hydrogen chloride can be proportionately increased taking into account the amount of halide to be deposited on the catalyst, and time required to complete the chlorination.

The high temperature secondary burn essentially completely removes the residual coke left from the low temperature primary burn without agglomeration, or increased agglomeration of the iridium component. In conducting the secondary burn, the levels of concentration of the hydrogen chloride and oxygen, respectively, in the gas, added or injected during the secondary burn, are increased as contrasted with the concentration of hydrogen chloride and oxygen employed in conducting the low temperature primary burn. A level of chloride ranging from about 100 vppm to about 5000 vppm chloride, preferably from about 150 vppm to about 3000 vppm chloride has been found effective in suppressing agglomeration of the iridium component during the secondary burn. The gas must also contain oxygen, generally up to about 5000 parts, per million parts by volume of gas (vppm), preferably from about 1000 vppm to about 5000 vppm of oxygen, more preferably from about 2000 vppm to about 4000 vppm of oxygen, this amount of oxygen being sufficient to provide a flame front temperature ranging above about 425° C. to a maximum of about 530° C., preferably from about 480° C. to about 510° C. The reaction time is sufficient for the flame front to pass through the bed of catalyst to effect at least about 90 percent burn off of the residual coke, or coke remaining from the low temperature burn, and preferably essentially complete coke removal (viz., 100 percent), based on the weight of the catalyst, without agglomeration, or increased agglomeration of the iridium component.

In conducting the primary burn, it has thus been found that hydrogen chloride in levels of about 10 vppm to about 100 vppm, preferably about 30 vppm to about 50 vppm, with the required amount of oxygen, are adequate to suppress iridium agglomeration. Occasionally however, it has been found that some iridium agglomeration can occur, e.g., as when the temperature of the primary burn exceeds about 425° C., too much moisture enters the system, or insufficient chloride is present on the catalyst to provide the required passivation. In such event, it has been found that the use in the secondary burn, of about 200 vppm hydrogen chloride, and greater, preferably from about 200 vppm to about 5000 vppm hydrogen chloride, along with the required amount of oxygen, will redisperse agglomerates of iridium that are produced during the primary burn caused by such upsets, or failure to strictly observe the specified regiment of conditions. This level of hydrogen chloride, with the required oxygen, is also adequate to remove all of the carbon from the catalyst. Moreover, in accordance with the more preferred practice of this invention, the oxygen concentration is increased, preferably in step-wise fashion, or linearly, preferably the latter, over the period of the burn to a level ranging from about 2.0 percent to about 5 percent, based on the volume of gas. By operating in this manner somewhat greater effectiveness is achieved in burning the residual coke from the catalyst. In addition, if the catalyst contains iridium agglomerates, as may have been caused by upsets in the primary regeneration step, the agglomerates are redispersed.

Iridium agglomeration has been found to reduce the metal surface area of the catalyst, this lessening catalyst activity and catalyst activity maintenance (cycle length). Only dispersed iridium can be effective in moderating coke formation and reducing the catalyst deactivation rate; iridium agglomeration, for purposes of the present invention, being defined as the percentage of the total iridium atoms on the catalyst in clusters of 50A, or greater, as measured by X-ray diffraction. If the conditions of the primary and secondary burn steps are carefully observed, there will be essentially no agglomeration of the iridium in burning the coke from the catalyst; in either the primary or secondary burn. An initial relatively low level of hydrogen chloride is incorporated with a coked iridium containing catalyst, optimally in amount sufficient, and at conditions sufficient to passivate the iridium component of the catalyst against agglomeration in the low temperature primary burn which removes a preponderance of the coke without agglomeration of the catalyst. Prior to initiation of the secondary burn, additional hydrogen chloride is added to the catalyst, again (1) in amount sufficient to passivate the iridium component against agglomeration in the higher temperature secondary burn which removes residual coke from the catalyst without agglomeration, or increase in the level of agglomeration, of the iridium component; and (2) in amount sufficient that, at the conditions given, any agglomerates of iridium produced in the low temperature, or primary burn step, via failure to strictly observe the required regimen of conditions, will be redispersed. No chlorine is injected into the process. Corrosion is minimized because the regeneration and reactivation of the catalyst is achieved in an essentially dry system.

Excessive chloride is removed from the catalyst by stripping the catalyst from the high temperature secondary burn of chloride by contact thereof with steam at temperature ranging from about 400° C. to about 500° C., preferably from about 470° C. to about 490° C. Preferably, excessive chloride is stripped from the catalyst by use of an admixture of steam and hydrogen chloride, the molar ratio of $H_2O$:HCl ranging from 80:1 to about 20:1, preferably from about 50:1 to about 30:1. The catalyst, after stripping will contain from about 0.8 percent to about 1.3 percent, preferably from about 0.9 percent to about 1.1 percent chloride, based on the weight of the catalyst (dry basis), at which time the regenerated catalyst is ready for use in an operating run for the conversion of a hydrocarbon feed.

The following is exemplary of the process of this invention. In conducting the following runs an admixture of 60 wt. % iron scale and a 40 wt. % platinum iridium catalyst was used to similate a platinum iridium catalyst contaminated with iron scale from a ferrous metal regenerator circuit. This admixture was used to simulate the top of a catalyst bed, as employed in a downflow reactor where iron scale from the regenerator circuit tends to preferentially concentrate. Pressures are given in terms of megapascal's (MPa), temperatures in terms of degrees Centrigrade, gas flow rates in terms of SCF/hr/lb catalyst, and all parts and percentages are expressed in terms of weight units except as otherwise expressed.

EXAMPLE

An admixture of iron scale (60 wt. %), and a coke deactivated platinum-iridium catalyst (0.3% Pt, 0.3wt. % Ir/$Al_2O_3$) which contained about 3 wt. % carbon, 0.9 wt. % chloride, 17 wt. % agglomerated iridium as measured by X-ray diffraction, with none of the iridium being present in oxide form, was regenerated as follows:

PRIMARY BURN

The level of chloride on the catalyst was raised from 0.9 wt. % to 1.1 wt. % by contact of the admixture with a dry nitrogen gas which contained 30 vppm HCl. The primary burn was then conducted, while gas was continuously injected into the reactor, in accordance with the schedule of conditions defined below as A and B, infra.

|  | A | B |
|---|---|---|
| Pressure, MPa | 0.53 | 0.53 |
| Temperature, °C. | 425 | 425 |
|  | maximum flame front | maximum flame front |
| Gas Composition |  |  |
| $O_2$, volume percent | 0.2 | 0.2 |
| HCl, volume ppm | 30 | 30 |
| $N_2$ | remainder | remainder |
| Gas Rate SCF/hr/lb cat | 27 | 27 |
| Duration | about 24 hours; until flame front has passed through bed. | about 34 hours; i.e., 10 hours after the flame front had passed through the bed. |

The composition of the iron scale component of the bed on completion of the low temperature burn period as defined in "A", and the extended low temperature burn period as defined in "B", is as follows, to wit:

| %     | A  | B  |
|-------|----|----|
| Fe    | 75 | 5  |
| Fe3O4 | 10 | 5  |
| Fe2O3 | 15 | 90 |

On completion of the "burns" as defined by schedules A and B, supra, the amount of iridium agglomerates remaining on the catalyst, determined by the size of the crystallites of iridium greater than 50 Angstrom Units as measured by X-ray diffraction, remained at 17 wt. % for both specimens.

CATALYST CHLORINATION

The level of chloride on the catalyst obtained in accordance with both schedules A and B, respectively, was raised from 1.1 wt. % to 1.5 wt. % by contact with nitrogen which contained hydrogen chloride in 2500 vppm concentration. The time required for the chlorination approximated 2 hours.

SECONDARY BURN/REDISPERSION

The secondary burn was conducted on the two specimens obtained in accordance with schedules A and B, respectively, while the gas employed in the catalyst chlorination was continuously injected into the reactor, at the following conditions.

| Pressure, MPa | 0.5 |
| Temperature, °C. | 510 |
| Gas Composition | |
| O2, volume percent | increased linearly with time from 0.2 to 3.0 |
| HCl, volume ppm | 200 |
| N2 | remainder |
| Gas Rate SCF/hr/lb cat | 27 |
| Duration hours | 6 |

On completion of the burn at the end of 6 hours, analysis showed that less than 0.1 percent of carbon remained on the two specimens of catalyst. The two specimens of catalyst showed no signs of iridium agglormeration by measurement with X-ray diffraction. On the other hand however, the two catalyst specimens produced in accordance with schedules A and B differed considerably in their iron content, calculated as metallic iron, to wit:

| % | A | B |
|---|---|---|
| Fe | 0.8 | 0.1 |

The difference in activity between the two catalyst specimens produced in accordance with schedules A and B, respectively, is shown by the following on-oil data, to wit:

ON-OIL DATA

Catalysts containing iron at such levels as A and B above were charged to a reactor and operated by contact with a naphtha feed at on-oil conditions for comparative purposes. Both catalysts were employed in two separate on-oil runs to process a feed described as follows:

| Feed | |
|------|---|
| Specific Gravity, 15° C. | 0.7480 |
| ASTM D-86, °C. | |
| IBP | 50 |
| 5 | 95 |
| 10 | 100 |
| 50 | 118 |
| 90 | 143 |
| 95 | 153 |
| FBP | 163 |
| RON. Cl | 56.4 |
| KW | 11.85 |
| Aniline Point, °C. | 49.4 |
| Refractive Index, $n_D^{20}$ | 1.4205 |
| Bromine No., g/100 ml | 0.16 |
| Water, wppm | 42 |
| Chloride, wppm | <2 |

Both on-oil runs were conducted at the following conditions of operations, to wit:

| Recycle Gas | |
|-------------|---|
| SCF/B | 4000 |
| Pressure, KPa, gage | 2240 |
| H2 Partial Pressure, KPa, abs | 1100–1170 |
| H/O Ratio | 2.7 |
| W/W/Hr | 2 |
| RON, Cl | 99 |
| Sulphur, wppm | <0.05 |
| Once-Through Equivalent | |

The catalyst reactivated in accordance with the procedure of Run B, which contained only 0.1% Fe, was found to have an activity considerably higher than that produced by the procedure of Run A. On a comparative basis, the activity of the higher iron content catalyst is below 100 whereas the activity of the catalyst produced by the procedure of Run A is greater than 150.

The metal hydrogenation-dehydrogenation component, or components, of the catalyst can be associated or composited with the porous refractory inorganic oxide by various methods known to the art. It is generally added to the catalyst in concentration ranging from about 0.01 percent to about 10 percent, preferably from about 0.1 to about 2 percent, based on the weight of the catalyst (dry basis). An especially preferred catalyst is one which contains about 0.01 to about 2 weight percent platinum, preferably from about 0.1 to about 0.6 weight percent platinum, and from about 0.01 to about 2 weight percent iridium, preferably from about 0.1 to about 0.6 weight percent iridium, on alumina. Where there is more than one component, the several components can be dispersed on the porous inorganic oxide support in intimate admixture with each other by a suitable technique such as ion exchange, coprecipitation, impregnation, or the like. It is not necessary that the components be incorporated onto the porous inorganic oxide support by the same technique. One component can be composited with the porous inorganic oxide by one method such as, for example, coprecipitation, and the other component associated with the porous inorganic oxide by another technique, i.e., impregnation. Furthermore, the components can be composited with the porous inorganic oxide either sequentially or simultaneously. It is generally preferred that the components be associated with the porous inorganic oxide by impregnation, either sequentially or simultaneously.

The metal, or metals, can be added in essentially any soluble form of the respective metal, or metals, together in the same solution or in sequence as, e.g., soluble salts, acids or other form of compounds. For example, iridium or platinum, or both, can be incorporated with a porous inorganic support in intimate admixture therewith by any suitable technique such as ion exchange, coprecipitation, impregnation, or the like. It is not essential that separate metal components be incorporated onto the porous inorganic oxide by the same technique. One metal, e.g., iridium can be associated with the porous inorganic oxide by one method, e.g., coprecipitation, and the other component, e.g., platinum, by another technique, e.g., impregnation, or vice versa. To incorporate, e.g., platinum onto a porous inorganic oxide support, impregnation with chloroplatinic acid is preferred but other platinum group compounds can be used such as ammonium chloroplatinates, polyamine platinum salts, platinum chloride, and the like. Iridium is suitably incorporated onto a support with periridic acid, ammonium or potassium salts of iridium, and the like. Other metal promoters, e.g., other Group VIII metal components, tin, tungsten, iron, rhenium, lead, germanium, and the like, can also be incorporated onto a porous inorganic oxide with iridium, or iridium and platinum, in similar manner.

Suitably, mildly or moderately acidic refractory oxides are employed as supports, e.g., silica, silica alumina, magnesia, thoria, boria, titania, zirconia, various spinels, and the like, including in particular alumina which is preferred. High surface area catalysts, or catalysts having surface areas ranging upwardly from about 50 square meters per gram (B.E.T. Method) are preferred. In particular, catalysts having surface areas ranging from about 100 to 250 square meters per gram, and higher, prove quite satisfactory.

In formation of the more active catalysts, refractory inorganic oxides of desired particle size distribution, in dry state, can be contacted, admixed, or otherwise incorporated with metal-containing solution, or solutions, and thereby impregnated. The refractory inorganic oxide can thus be pilled, pelleted, beaded, or extruded, alone or in admixture with other materials, and dried and crushed to form particles of desired size ranging, e.g., from about 0.1 to about 0.4 inch, and preferably from about 0.2 to about 0.3, average diameter. The material can then be treated by contact with a solution containing the desired amount of metal, or metals, or treated sequentially by contact with a solution containing one metal and then the other, in the desired amounts. On the other hand, larger particles can be so-treated and then crushed to the desired size. The particulate mass, in either instance, can be dried and calcined, and contacted with hydrogen, generated in situ or ex situ, to reduce the salt. Suitably, also, the catalyst composite can be formed by adding together suitable reagents such as salts of a metal, or metals, and ammonium hydroxide or ammonium carbonate, and a salt of alumina such as aluminum chloride and aluminum sulfate to form aluminum hydroxide. The aluminum hydroxide containing the salts of the metal, or metals, can then be heated, dried and simultaneously converted to alumina and/or further impregnated with a metal, or metals, if desired. The material can then be calcined and then hydrogen-treated, in situ or ex situ, to reduce the salts and complete the formation of the catalyst composite.

Essentially any petroleum or hydrocarbon fraction containing paraffins, naphthenes, and the like, can be reformed and the catalyst regenerated. A suitable feed, e.g., a naphtha, either virgin or cracked, Fischer-Tropsch or mixtures thereof, is contacted at reforming conditions in the presence of hydrogen with a catalyst composite including the support which contains catalytically active amounts of iridium or admixtures of iridium and platinum, or iridium and platinum with other metals. Typical feed stream hydrocarbon molecules are those containing from about 5 to about 12 carbon atoms, or more preferably from about 7 to about 9 carbon atoms. Naphthas, or petroleum fractions boiling within the range of from about 80° F. to about 375° F., contain hydrocarbons of carbon numbers within these ranges. Typical fractions thus usually contain from about 20 to about 80 volume percent of paraffins, both normal and branched, which fall in the range of about $C_5$ to $C_{12}$, and 5 through about 20 volume percent of the desirable aromatics falling within the range of from about $C_6$ to $C_{12}$.

It is apparent that various other modifications and changes can be made without departing the spirit and scope of the invention.

Having described the invention, what is claimed is:

1. In a reforming process for regenerating and reactivating within a reactor a bed constituted of an admixture of iron scale and a catalyst comprised of an iridium component dispersed upon an inorganic oxide support catalytically deactivated during the on-oil portion of a reforming cycle of operation by coke deposition thereon, the reactor being contained in a multi-reactor unit, the individual reactors of which are connected in series via suitable piping and valving such that said reactor can be alternately manifolded with production facilities during the on-oil portion of the operating cycle during which period the catalyst of said reactor becomes coked, and with a ferrous metal regeneration circuit during the catalyst regeneration and reactivation portion of an operating cycle during which period iron scale is carried over from the regeneration circuit to the bed of catalyst contained in the reactor when the catalyst is regenerated and reactivated, the steps required for regeneration and reactivation of the bed of coked catalyst of said reactor including (i) providing said bed of admixed iron scale and catalyst with a chloride level on the catalyst ranging from about 0.9 percent to about 1.5 percent, based on the weight of the catalyst, (ii) burning a preponderance of the coke from the catalyst while adding a gas containing hydrogen chloride sufficient to maintain the chloride level on the catalyst within a range of from about 0.9 percent to about 1.5 percent, based on the weight of the catalyst, and oxygen in concentration ranging up to about 5000 parts, based on a million parts by volume of the gas, to provide a flame front temperature not exceeding about 425° C. sufficient to burn the coke from the catalyst of the admixture.

the improvement comprising continuing in step (ii) to treat the bed of admixed iron scale and catalyst with the gaseous admixture after the burn off of coke has ceased until the iron scale has been substantially oxidized to ferric oxide and thereby passivated, and then (iii) increasing the chloride level of the catalyst to at least about 1.6 percent, based on the weight of the catalyst, and then (iv) contacting said catalyst with a gas containing hydrogen chloride in concentration ranging from about 100 parts to about 5000 parts, based on a million parts by volume of the gas, up to about 5000 parts oxygen, based on a million parts by volume of the gas, to provide a flame front temperature greater than about 425° C. sufficient to redisperse the agglomerated iridium and substantially complete the removal of coke from the catalyst, whereby reaction between the iron scale and catalyst, which decreases the normal activity of the catalyst, is suppressed.

2. The process of claim 1 wherein the bed of admixed iron scale and catalyst in step (ii) is treated after coke burn off for a period ranging up to about 12 hours.

3. The process of claim 2 wherein the period of treatment after coke burn off ranges from about 4 hours to about 12 hours.

4. The process of claim 1 wherein the bed of admixed iron scale and catalyst in step (i) is contacted with a dry hydrogen chloride gas to provide the required level of chloride on the catalyst.

5. The process of claim 4 wherein the gaseous hydrogen chloride gas is sufficient to provide a chloride level on the catalyst ranging from about 1.0 percent to about 1.2 percent, based on the weight of the catalyst.

6. The process of claim 1 wherein the bed of admixed iron scale and catalyst in (ii) is contacted with a gas containing hydrogen chloride sufficient to maintain the chloride level within a range of from about 1.0 percent to about 1.2 percent, and oxygen in concentration ranging from about 2000 parts to about 4000 parts.

7. The process of claim 1 wherein the chloride level of the catalyst of the bed of admixed iron scale and catalyst in step (iii) is increased up to about 2.5 percent by contact with the gas, and the level of oxygen is maintained with a range of from about 2000 parts to about 5000 parts in burning the coke from the catalyst.

8. The process of claim 1 wherein the flame front temperature in step (iii) is maintained at from about 425° C. to about 530° C. in burning the coke from the catalyst.

9. The process of claim 1 wherein the chlorid is stripped from the catalyst of the bed of admixed iron scale and catalyst subsequent to step (iv) by contact with steam.

10. The process of claim 9 wherein the steam is admixed with hydrogen chloride in molar ratio of $H_2O:HCl$ ranging from about 80:1 to about 20:1.

11. The process of claim 10 wherein the ratio of $H_2HCl$ ranges from about 50:1 to about 30:1.

12. The process of claim 1 wherein step (i) is preceded by a reduction step wherein the admixture of iron scale and catalyst is contacted with hydrogen.

* * * * *